US009222231B2

(12) United States Patent
Marconi (10) Patent No.: US 9,222,231 B2
(45) Date of Patent: Dec. 29, 2015

(54) ELECTRICALLY POWERED HAND SPREADER

(71) Applicant: Fred Marconi, Erieville, NY (US)

(72) Inventor: Fred Marconi, Erieville, NY (US)

(*) Notice: Subject to any disclaimer, the term of this patent is extended or adjusted under 35 U.S.C. 154(b) by 340 days.

(21) Appl. No.: 13/833,560

(22) Filed: Mar. 15, 2013

(65) Prior Publication Data

US 2014/0263484 A1 Sep. 18, 2014

(51) Int. Cl.

| | |
|---|---|
| *A01M 9/00* | (2006.01) |
| *E01H 10/00* | (2006.01) |
| *A01C 7/02* | (2006.01) |
| *A01C 15/02* | (2006.01) |

(52) U.S. Cl.
CPC *E01H 10/00* (2013.01); *A01C 7/02* (2013.01); *A01C 15/02* (2013.01); *A01M 9/0046* (2013.01)

(58) Field of Classification Search
CPC . A01M 9/003; A01M 9/0007; A01M 9/0038; A01M 9/0046; A01C 15/04; A01C 15/02; A01C 7/02; E01C 19/205; B65D 90/626; B65D 88/64; B65D 88/66; B65D 88/68; B65D 23/10; B65D 47/28; E01H 10/00

USPC ................ 222/630, 325, 465.1, 561; 239/650

See application file for complete search history.

(56) References Cited

U.S. PATENT DOCUMENTS

| | | | | |
|---|---|---|---|---|
| 3,993,225 | A | 11/1976 | Manni | |
| 5,119,993 | A * | 6/1992 | Gunzel et al. | 239/654 |
| 5,190,225 | A | 3/1993 | Williams | |
| 5,409,166 | A * | 4/1995 | Gunzel et al. | 239/142 |
| 5,934,573 | A * | 8/1999 | Weterrings et al. | 239/650 |
| 6,729,557 | B2 | 5/2004 | Dillon | |
| 6,840,468 | B2 * | 1/2005 | Barnett | 239/654 |
| 7,281,675 | B2 | 10/2007 | Elrod et al. | |
| 7,328,861 | B2 | 2/2008 | Sagol et al. | |
| 2006/0016918 | A1 * | 1/2006 | Sagol et al. | 239/653 |
| 2007/0034710 | A1 * | 2/2007 | Elrod et al. | 239/146 |
| 2007/0194155 | A1 | 8/2007 | Kendall | |
| 2007/0290003 | A1 * | 12/2007 | Morin et al. | 222/325 |
| 2012/0168540 | A1 | 7/2012 | Kressy et al. | |
| 2013/0001332 | A1 * | 1/2013 | Marconi, Jr. | 239/657 |

* cited by examiner

*Primary Examiner* — Arthur O Hall
*Assistant Examiner* — Juan C Barrera
(74) *Attorney, Agent, or Firm* — David L. Nocilly; Bond Schoeneck & King, PLLC (57) ABSTRACT

A handheld spreader having a fillable container for dispensing particulate from an electrically powered blower assembly in a detachable base. The spreader includes a feed slide leading from the container to the air stream channel of the base that has a vibrating eccentric plate for guiding and improving the flow of particulate from container into the air stream. The container and base are frictionally engaged together, thereby allowing for easy assembly of spreader, including assembly after container has been filled with particulate, as well as easy reassembly if container is removed and refilled. The spreader includes a rotating slide that may be operated by a user to open and partially close the feed slide of the container to control the feed rate.

14 Claims, 10 Drawing Sheets

ELECTRICALLY POWERED HAND SPREADER

BACKGROUND OF THE INVENTION

1. Field of the Invention

The present invention relates to particulate spreading devices and, more particularly, to an electrically powered hand spreader.

2. Description of the Related Art

Home owners frequently need to dispense particulate matter, such as lawn fertilizer, weeding chemicals, grass seed, and even salt, over a given area, such as lawn, sidewalk or driveway. Conventional methods for spreading or dispensing particulate have a hopper that is manually filled particulate and allows the particulate to gravity feed onto a spinning spreader plate that cases the particulate outwardly. The spreader is usually powered by mechanical interconnection to wheels or a hand crank associated with the spreader plate so that the plate is causes to spin and the user pushes the hopper along the ground or turns the hand crank. These systems typically have poor distribution and control over dispensing, and require that the user physically drive spreading operations by moving along the ground or turning a crank. These systems also require a lot of contact between the user of the system and the particulate to be spread, which is a significant disadvantage due to the hazardous nature of many particulates.

While automatically powered spreaders avoid the need for the user to provide the distributing force, they suffer from many of the same drawbacks. For example, electrically powered spreader plates still have poor distribution and control, due in part to the lack of means for ensuring flow of particular from the container to the distributor, and also require that the user manually handle particulate. Other systems, such as those the attached to conventional leaf blowers are mechanically complicated and expensive. While these systems may be attractive to commercial customers, they are not too expensive and complicated for the average homeowner and require the use of additional equipment that is expensive and difficult to use.

BRIEF SUMMARY OF THE INVENTION

It is therefore a principal object and advantage of the present invention to provide a powered handheld spreader that has improved particulate distribution.

It is an additional object and advantage of the present invention to provide a powered handheld spreader that minimizes contact with particulate.

It is a further object and advantage of the present invention to provide a powered handheld spreader that is less expensive and may be easily replenished or reused.

It is also an object and advantage of the present invention to provide a powered handheld spreader that is easy to manufacture and can be filled with particulate during the assembly process.

In accordance with the foregoing objects and advantages, the present invention provides a handheld spreader having a fillable container that is interconnected to a base assembly having a blower and air flow channel via a slide having a vibrating eccentric plate for guiding particular matter and improving flow of particulate into channel. Particulate dispensed from the container is collected in the air flow channel and distributed out of the spreader. The container and base are further interconnected by a coupling member that frictionally engages and seals the container to the base, thereby allowing for easy assembly of spreader, including assembly after container has been filled with particulate as well as easy reassembly if container is removed and refilled at a later date. The spreader further comprises a sliding gate that may be operated by a user to open and close the opening of the container while simultaneously activating and deactivating the blower motor.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
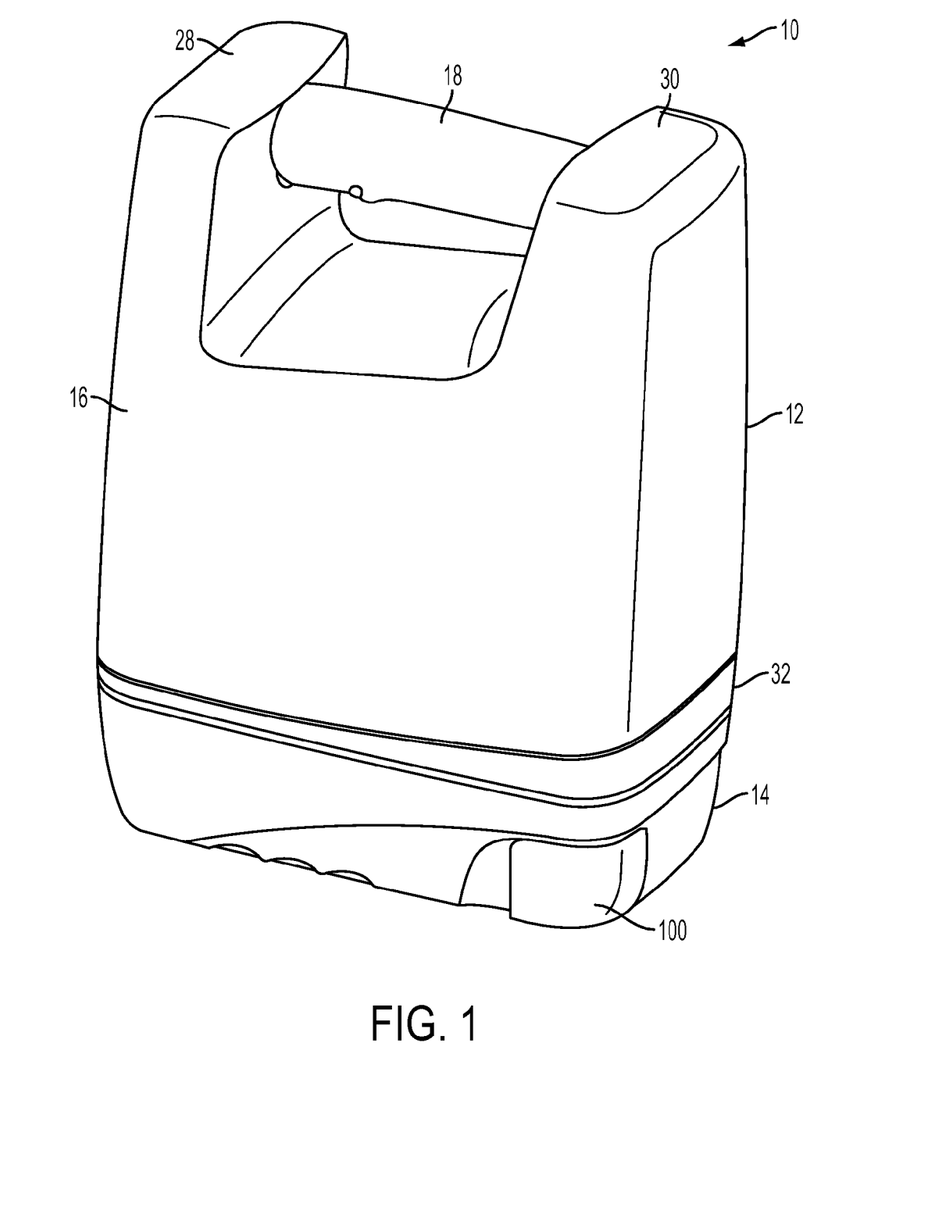
FIG. 1 is a perspective view of a powered hand spreader according to the present invention.
Figure 2:
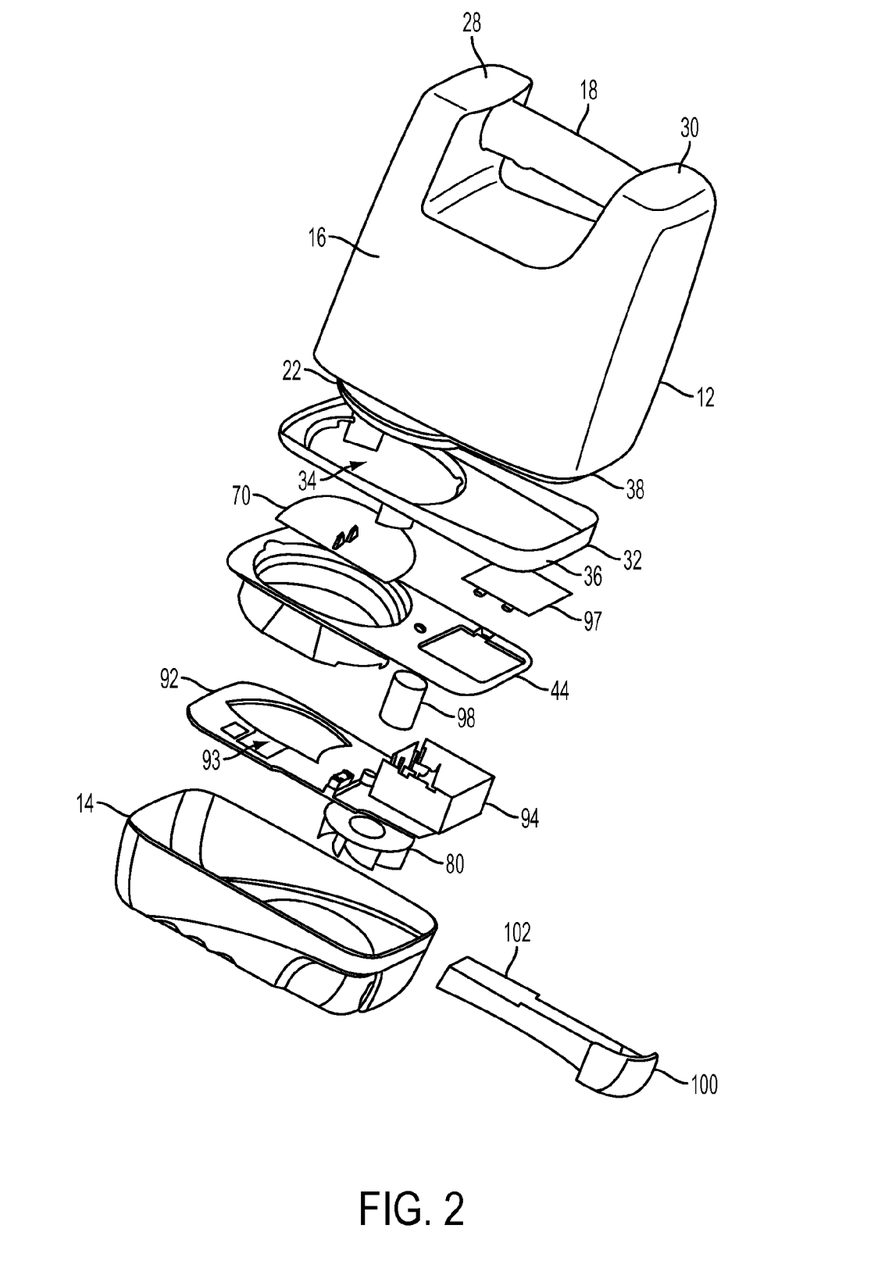
FIG. 2 is a perspective, exploded view of a powered hand spreader according to the present invention.
Figure 3:
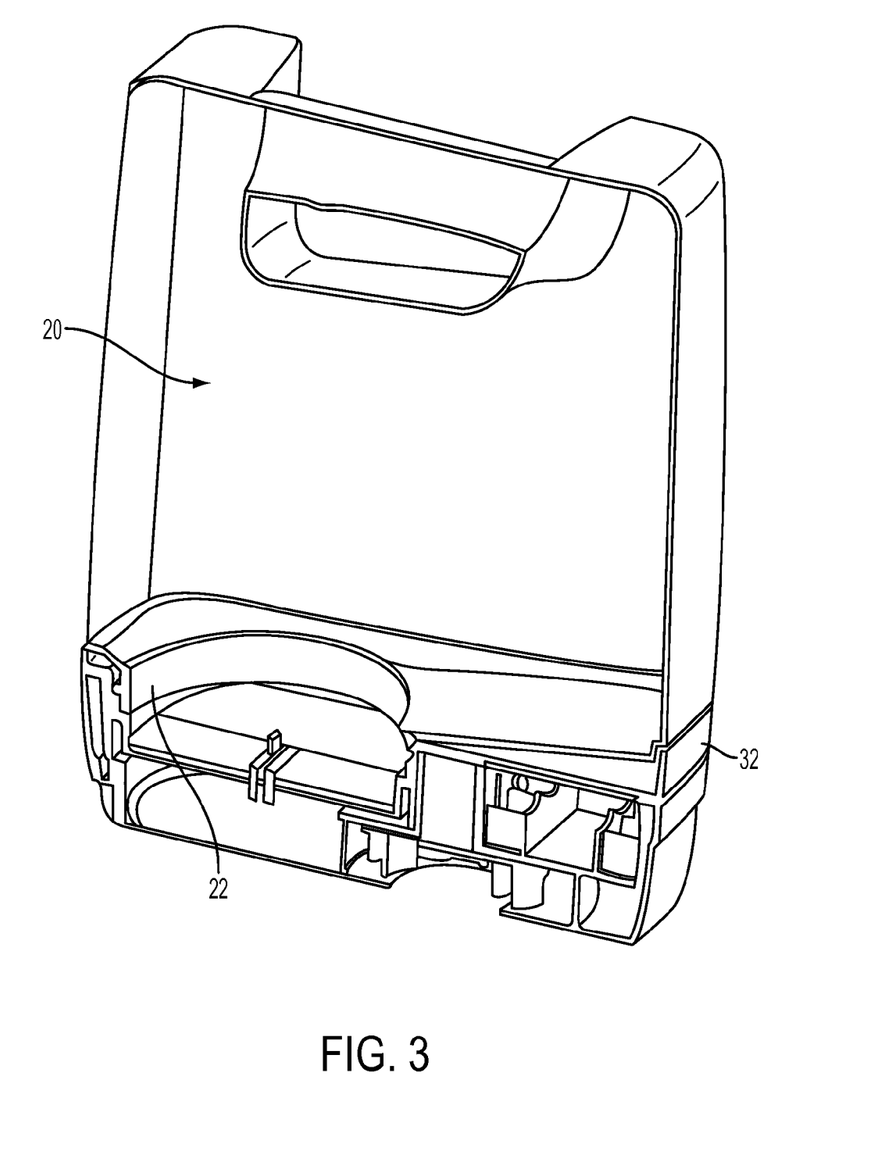
FIG. 3 is a longitudinal cross-section of an assembled powered hand spreader according to the present invention.

Referring now to the drawings, wherein like reference numerals refer to like parts throughout, there is seen in FIG. 1 a powered hand spreader 10 according to the present invention. Spreader 10 comprises an upper assembly having a container 12 that may be selectively attached to or detached from a bottom assembly comprising a base 14.

Figure 4:
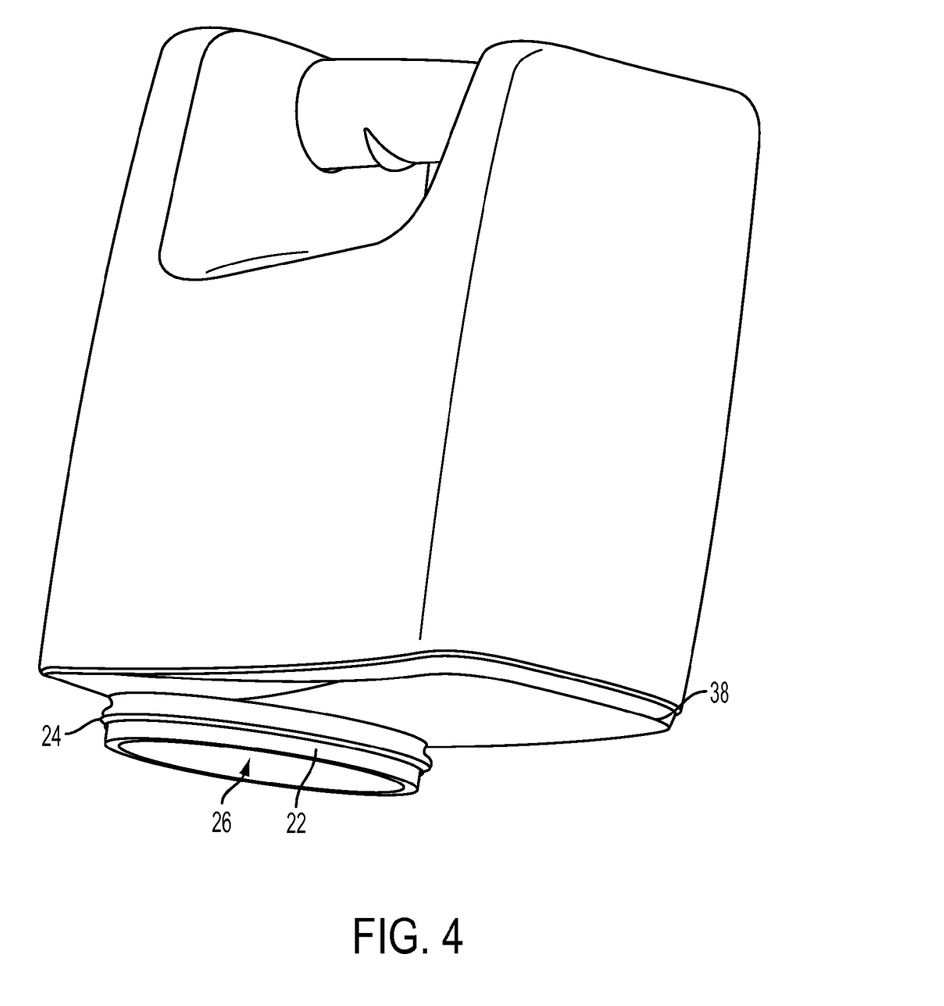
FIG. 4 is a perspective view of a container for a powered hand spreader according to the present invention.

Container 12 comprises an upper housing 16 having a user handle 18 and defining a cavity 20 therein for holding particulate matter therein. As seen in FIG. 4, container 12 further includes a tubular chute 22 extending outwardly therefrom and having a series of circumferentially extending external ridge 24. Tubular chute 22 defines an opening 26 in the bottom of container 12 that allows any particulate in cavity 20 to be a gravity fed out of container 12 through opening 26. It should be recognized by those of skill in the art that opening 26 may be temporarily covered by a foil or other closure to ensure that any potentially harmful particulate stored in container 12 are maintained in place prior to spreading operations. Container 12 is preferably blow molded and further includes a pair of planar surfaces 28 and 30 to allow container 12 to be stably positioned on a horizontal surface with opening 26 facing upwardly.

As seen in FIG. 4, container 12 is interconnected to base 14 via a hook plate 32 that engages and is retained to the lower edge of container 12 via a hole 34 formed therethrough which tubular chute 22 may extend so that hole 34 engages ridge 24. Hook plate also include a peripheral edge 36 dimensioned to encompass and retain the lower edge 38 of container 12. Due to the inherent inaccuracies in blow molding processes, hook plate 32 can be injection molded and used to compensate for manufacturing irregularities in container 12 so that container 12 and hook plate 32 have consistent dimensions for further coupling to the bottom assembly of spreader 10. As explained in detail below, this provides a modular design and allows for dependable coupling of container 12 to base 14. To connect to base 14, hook plate 32 further includes two opposing tabs 40 and 42 extending from hole 34 for releasable attachment to the rest of spreader 10.

Figure 5:
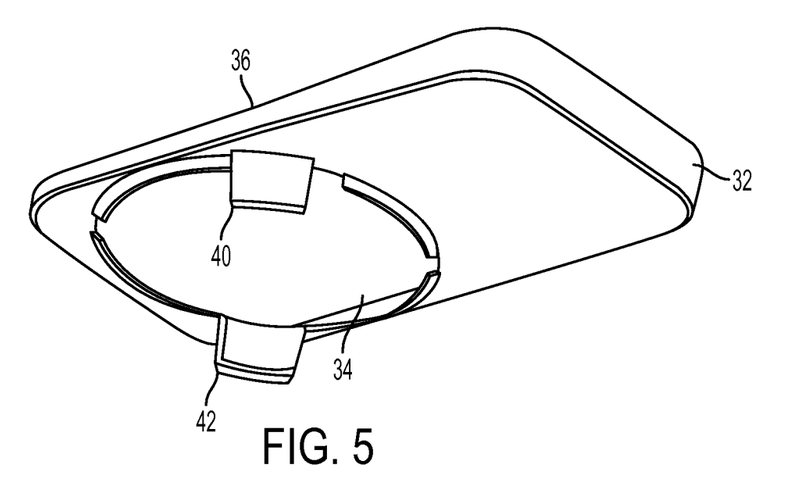
FIG. 5 is a perspective view of a hook plate for a powered hand spreader according to the present invention.
Figure 6:
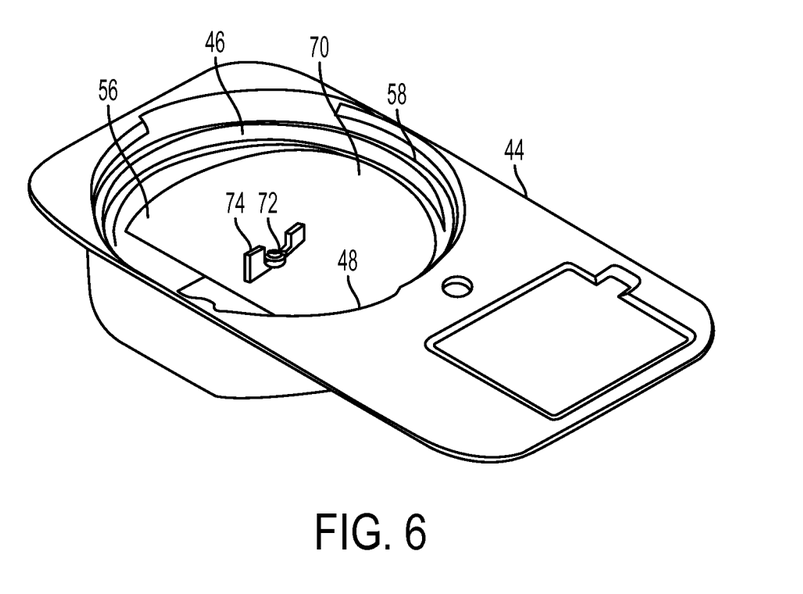
FIG. 6 is a perspective view of a slide plate for a powered hand spreader according to the present invention.
Figure 7:
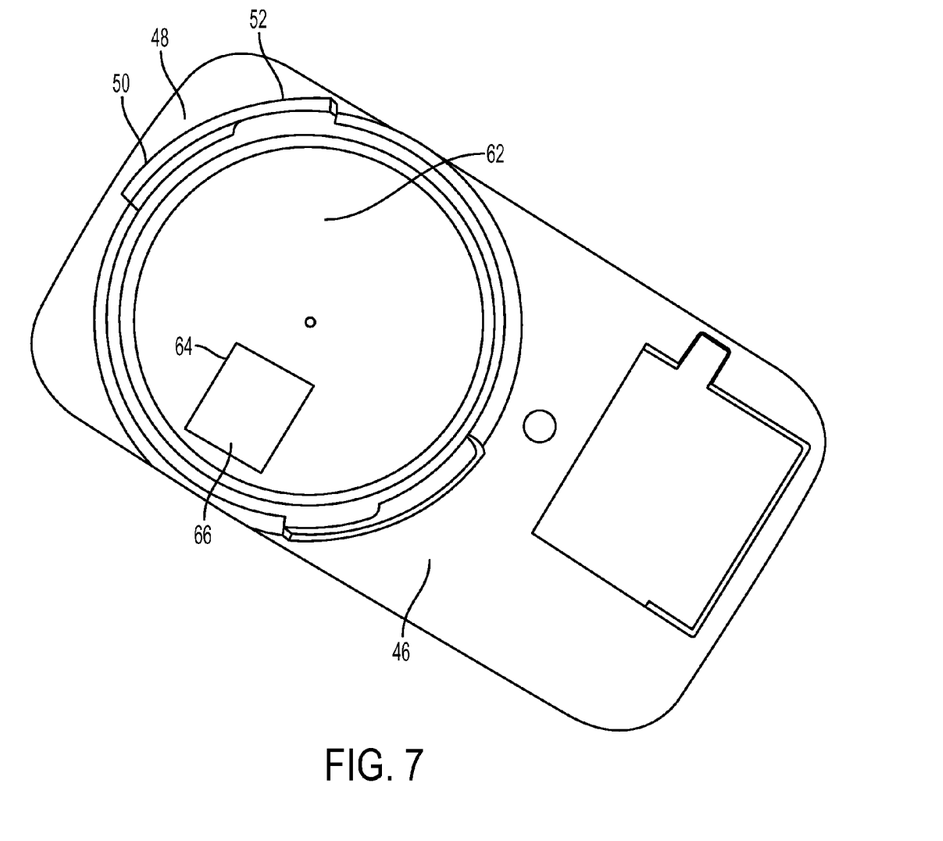
FIG. 7 is a top plan of a slide plate for a powered hand spreader according to the present invention.
Figure 8:
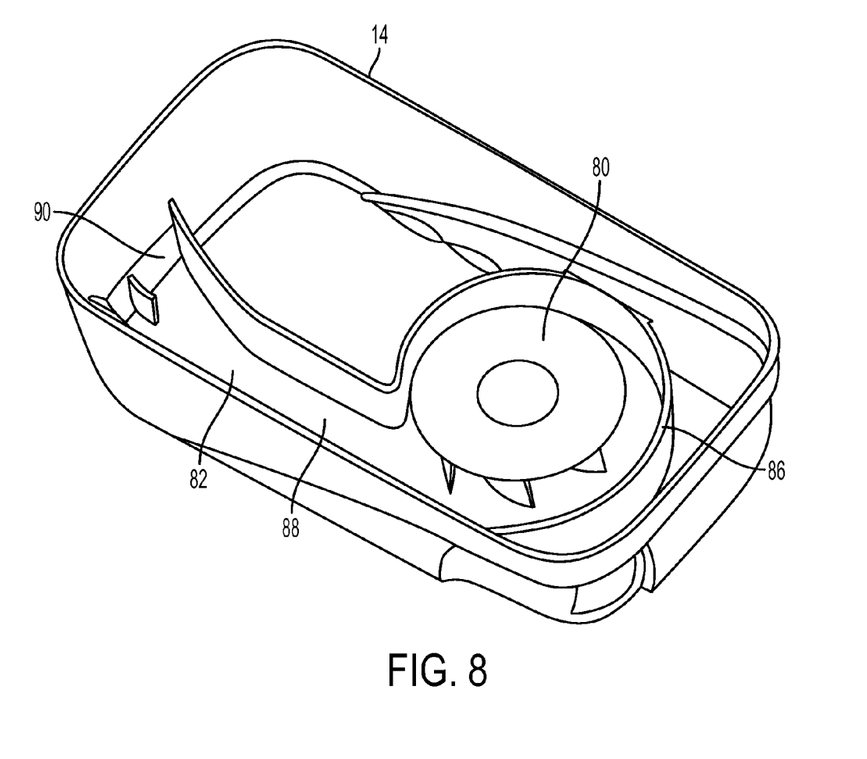
FIG. 8 is a perspective view of a base for a powered hand spreader according to the present invention.
Figure 9:
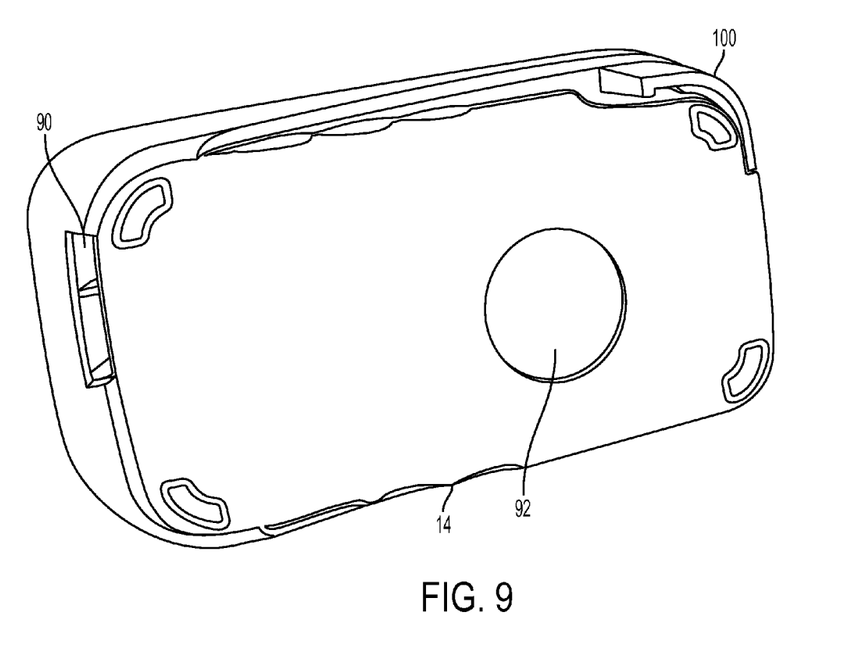
FIG. 9 is a second perspective view of a base for a powered hand spreader according to the present invention.
Figure 10:
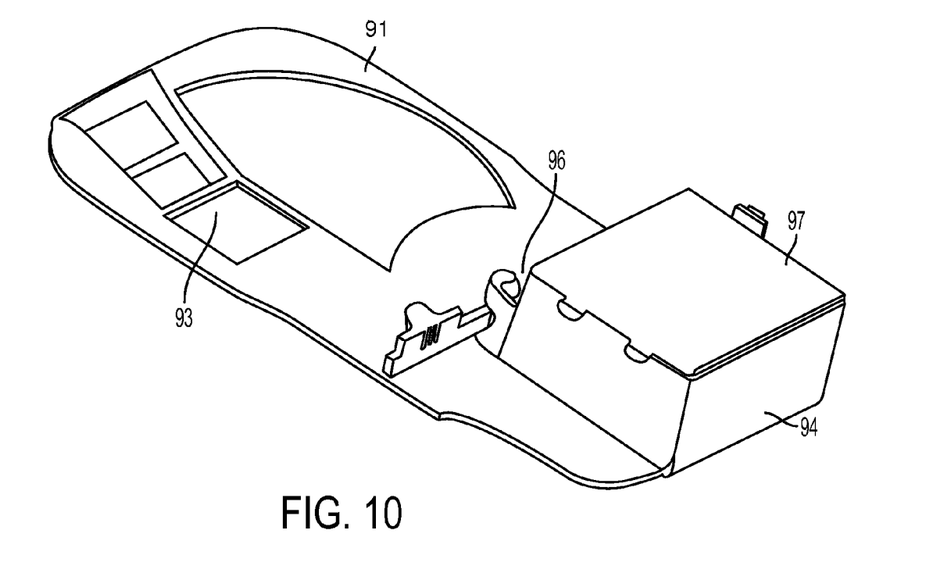
FIG. 10 is a perspective view of a cover for a powered hand spreader according to the present invention.
Figure 11:
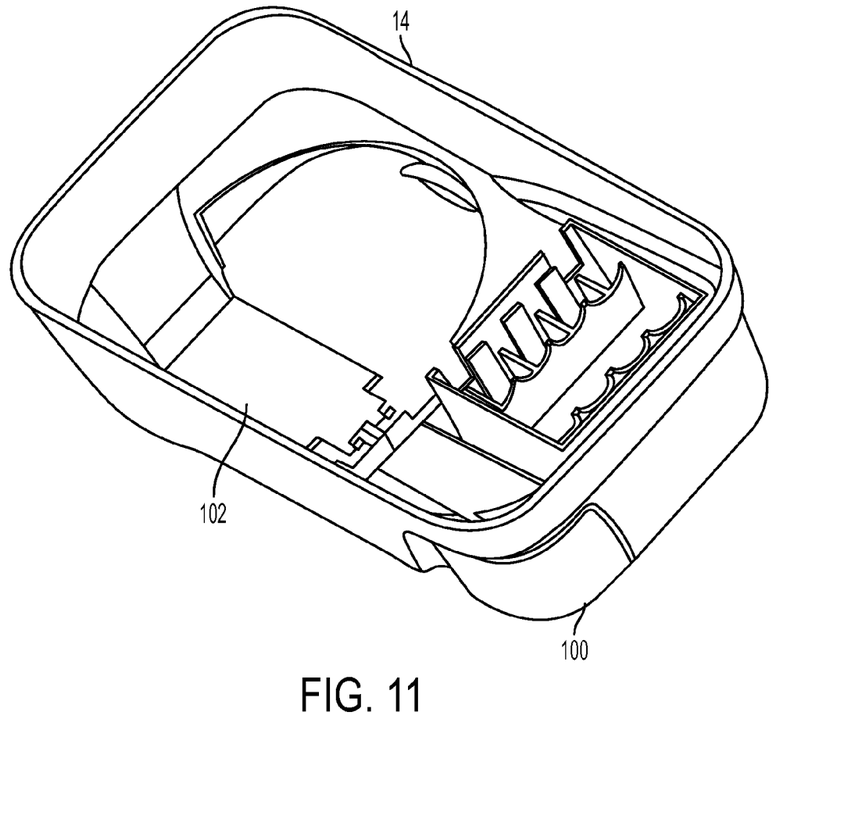
FIG. 11 is a perspective view of a base and pull assembly for a powered hand spreader according to the present invention.

Referring to FIGS. 5 and 6, spreader 10 further comprises a slide plate 44 having slots 46 and 48 corresponding to tabs 40 and 42, respectively, to allow container 12 and hook plate 32 to be releasably attached to slide plate 44. For example, slots 46 and 48 may each have a first, wide receiving portion 50 that extends to a second, narrow locking portion 52 so that container 12 and hook plate 32 may be mated with slide plate 44 by positioning container 12 and hook plate 32 at a rotationally offset angle from slide plate 44, inserting tabs 40 and 42 into each wide receiving portion 50 of each of slots 46 and 48, then rotating container 12 and hook plate 32 relative to slide plate 44 so that tabs 40 and 42 are moved into frictional locking engagement with narrow locking portion 52 of each of slots 46 and 48 to firmly engage container 12 and hook plate 32 with slide plate 44. Reverse rotation of container 12 and hook plate 32 relative to slide plate 44 thus allows for container 12 and hook plate 32 to be disengaged from slide plate 44.

Slide plate 44 further includes a tubular channel 56 that has a first end 58 that is aligned and dimensioned to mate with tubular chute 22 of container 12. The opposing end 60 of tubular channel 56 includes a first, closed portion 62 that covers a portion of opening 26 of container 12 as well as a second, open portion 64 having a control aperture 66 that is in fluid communication with opening 26 of container 12, thereby reducing the amount of particulate that can be gravity fed out of opening 26 of container 12. A rotatable slide 70 comprising a partial disk is positioned in tubular channel 56, such as by a pivot boss 72, to be moveable in response to manual input, such as by grasping one of more protrusions 74 extending from slide 70. Slide 70 can thus be selectively positioned to cover none or various amounts of control aperture 66, thereby allowing adjustment of the amount of particulate that can flow from container 12 through chute 22 and out of control aperture 66.

In addition to controlling size of control aperture 66, slide 70 assists in the dispensing of particulate by ensuring a relatively even flow of particulate into base 14. More particularly, slide 70 may be aligned so that it does not extend perpendicularly to the direction of flow of particulate and thus encourages particular to flow toward control aperture 66. In addition, by virtue of the agitation produced by the rotation of a blower 80, described in detail below, slide 70 will vibrate at a high frequency corresponding to the rotational speed of blower 80. This vibration of slide 70 assists with the flow of particulate to and through aperture 66 by preventing bridging of the particulate or stoppage of flow. To improve vibration of slide 70, blower 80 may comprise an unbalanced fan, such as one having a single fan blade that is thicker than the other blades.

Referring to FIG. 8, spreader 10 further comprises a base 14 having a passageway 82 positioned in operative relation to control aperture 66 to accept any particulate matter and eject it from spreader 10. More particularly, passageway 82 extends from a point adjacent to blower 80 circumferentially around blower 80, thereby forming a shroud 86 for blower 80, while gradually widening until a point 88 just proximate to and upstream of control aperture 66. At a point 88 just prior to control aperture 66, passageway 82 narrows slightly and then widens again as reaches and passes under aperture 66 and continues widening until reaching an exit opening 90 formed in base 14. Thus, any particulate fed through control aperture 66 will be entrapped in the airstream created by blower 80, forced along passageway 82 and driven out of exit opening 90. As seen in FIG. 8, base 14 further includes an air intake 92 in fluid communication with blower 80 so that blower can create an air stream in passageway 82 that leads out of exit opening 90. The width of passageway 82 is defined and controlled as explained above to reduce air pressure at blower 80, thereby improving efficiency, and also to create a slight negative pressure in passageway 82 underneath control aperture 66. As a result, particulate being fed from container 12 is less likely to be forced back into container 12 and will instead be drawn into passageway 82 by gravity and a slight venturi effect.

Referring to FIG. 10, base 14 further comprises a cover 91 positioned over passageway 82 that includes an opening 93 aligned with control aperture 66 and passageway 82 to permit fluid communication therebetween. Cover 91 further includes a battery compartment 94 and a detent 96 for supporting a motor 98 that is interconnected to and drives blower 80. Battery compartment 94 may include a door 97 enclosing compartment 94 that is aligned with and positioned in slide plate 44. Thus, in a preferred embodiment, slide plate 44, cover 91, and base 14 for a bottom assembly for spreader 10 and may be manufactured and assembled separately from container 12 and then coupled or decoupled from the upper assembly of container 12 and hook plate 32 during manufacturing or by a user.

Referring to FIG. 11, base 14 additionally includes a pull 100 that is moveable between a first, closed/off position and a second, open/on position. Pull 100 is operatively interconnected to motor 98, such as by having movable electrical contact points as part of a switch, to allow manual activation and deactivation of blower 80 as desired. Pull 100 further includes an extending portion 102 that is capable of selectively covering the opposite side of control aperture 66 from slide 70. Thus, at the same time that pull 100 electrically activates or deactivates blower 80, pull 100 also selectively uncovers and covers control aperture 66. Preferably, the distance that pull 100 moves before turning on blower 80 is less than the distance required to uncover aperture 66, thus allowing an air stream to be formed in passageway 82 by blower 80 before any particulate is allowed to fall into passageway 82 through control aperture 66.

Spreader 10 thus includes two assemblies that may be readily detached from each other. First, is an upper assembly comprising container 10 and hook plate 32 that are frictionally engaged to each other (such as at the time of manufacture) and, second is the bottom assembly comprising slide plate 44, cover 93, and base 14, which can be permanently attached to each other at manufacture. This modularity allows either bottom assembly or top assembly to be reused or reconfigured for attachment to a replacement for the other assembly, as desired or needed.

A user can thus obtain a spreader 10 that has been pre-filled with particulate, take spreader 10 to the location where the particulate is to be spread, extend pull 100 to activate blower 80 and, nearly simultaneously, allowing particulate to fall into passageway 82, thereby blowing particulate out of spreader 10 onto the desired location. When spreading operations have concluded, the user can close pull 100, thereby preventing any more particulate from being dispensed into base 14 and also turning off blower 18. If all particulate has been exhausted, the user can separate base 14 from container 12 by twisting container 12 relative to slide plate 32, and then attach a filled container 12 or a refilled container 12 back to base 14 for further use.

What is claimed is:

1. A powered hand spreader, comprising:
   a base having a passageway having a blower positioned at one end and that extends to a second end in communication with an opening formed in said base;
   a cover positioned over said base and enclosing at least a portion of said passageway;
   a slide plate positioned over said cover and including a channel that extends along an axis from a first open end to a second partially closed end having a control aperture formed therein, wherein said control aperture is in fluid communication with an intermediate portion of said passageway, wherein said slide plate includes a pair of opposing slots formed therein and wherein each of said slots includes a first wide portion and a second narrow portion;
   a slide positioned in said channel for rotation between a first position wherein said control aperture is not covered by said slide and a second position where said slide at least partially covers said control aperture;
   a hook plate having a hole formed therethrough; and
   a container defining a cavity therein and including a chute that engages with said hole of said hook plate and that is in fluid communication with said cavity and said channel of said slide plate.

2. The spreader of claim 1, wherein said hook plate includes a pair of opposing tabs extending from said hole to engage with said pair of opposing slots.

3. The spreader of claim 2, wherein said hook plate may be selectively engaged and disengaged from said slide plate by rotation of said hook plate relative to said slide plate such that said opposing pair of tabs may be moved between an engaged position where said each of said tabs is tightly engaged with the narrow portion of each of said slots and a disengaged position wherein said each of said tabs are positioned in a respective wide portion of each of said slots such that said tabs may be separate from said slots.

4. The spreader of claim 1, wherein said passageway gradually widens from a point proximate to said blower to a second point prior to any communication between said passageway and said opening.

5. The spreader of claim 4, wherein said passageway narrows at said second point and then widens again at said opening.

6. The spreader of claim 1, wherein said slide includes a protrusion for manual rotation of said slide.

7. The spreader of claim 1, wherein said hook plate includes a peripheral edge that frictionally engages said container.

8. A powered hand spreader, comprising:
   a base having a passageway having a blower positioned at one end and that extends to a second end in communication with an opening formed in said base;
   a cover positioned over said base and enclosing at least a portion of said passageway;
   a slide plate positioned over said cover and including a channel that extends along an axis from a first open end to a second partially closed end having a control aperture formed therein, wherein said control aperture is in fluid communication with an intermediate portion of said passageway;
   a slide positioned in said channel for rotation between a first position wherein said control aperture is not covered by said slide and a second position where said slide at least partially covers said control aperture;
   a hook plate having a hole formed therethrough;
   a container defining a cavity therein and including a chute that engages with said hole of said hook plate and that is in fluid communication with said cavity and said channel of said slide plate; and
   a pull operatively interconnected to said blower and movable between a retracted position where said blower is deactivated and an extended position where said blower is activated to produce an air stream in said passageway.

9. The spreader of claim 8, wherein said pull includes a portion that is operatively interconnected to said opening of said cover such that said opening is covered by said portion of said pull when said pull is in said retracted position and is uncovered when said pull is in said extended position.

10. The spreader of claim 9, wherein movement of said pull from said retracted position to said extended position activated said blower before said opening is first uncovered.

11. The spreader of claim 8, further comprising a battery compartment positioned in said base.

12. The spreader of claim 11, further comprising a motor electrically interconnected to said battery compartment and operatively interconnected to said blower.

13. The spreader of claim 12, wherein said pull electrically disconnects said battery compartment from said motor when said pull is in said retracted position and electrically connects said batter compartment to said motor when said pull is in said extended position.

14. A powered hand spreader, comprising:
   a base having a passageway having a blower positioned at one end and that extends to a second end in communication with an opening formed in said base;
   a cover positioned over said base and enclosing at least a portion of said passageway;
   a slide plate positioned over said cover and including a channel that extends along an axis from a first open end to a second partially closed end having a control aperture formed therein, wherein said control aperture is in fluid communication with an intermediate portion of said passageway;
   a slide positioned in said channel for rotation between a first position wherein said control aperture is not covered by said slide and a second position where said slide at least partially covers said control aperture, wherein said slide extends along a plane that is non-perpendicular to said axis of said channel;
   a hook plate having a hole formed therethrough; and
   a container defining a cavity therein and including a chute that engages with said hole of said hook plate and that is in fluid communication with said cavity and said channel of said slide plate.

* * * * *